US011341981B2

(12) United States Patent
Moon et al.

(10) Patent No.: US 11,341,981 B2
(45) Date of Patent: May 24, 2022

(54) METHOD FOR PROCESSING AUDIO DATA AND ELECTRONIC DEVICE THEREFOR

(71) Applicant: Samsung Electronics Co., Ltd., Gyeonggi-do (KR)

(72) Inventors: Hangil Moon, Gyeonggi-do (KR); Hyunwook Kim, Gyeonggi-do (KR); Sanghoon Lee, Gyeonggi-do (KR); Euibum Han, Gyeonggi-do (KR)

(73) Assignee: Samsung Electronics, Co., Ltd, Suwon-si (KR)

( * ) Notice: Subject to any disclaimer, the term of this patent is extended or adjusted under 35 U.S.C. 154(b) by 274 days.

(21) Appl. No.: 16/793,370

(22) Filed: Feb. 18, 2020

(65) Prior Publication Data

US 2020/0265854 A1 Aug. 20, 2020

(30) Foreign Application Priority Data

Feb. 19, 2019 (KR) ........................ 10-2019-0019112

(51) Int. Cl.
*G10L 21/04* (2013.01)
*G10L 19/16* (2013.01)
*H04R 3/00* (2006.01)

(52) U.S. Cl.
CPC .............. *G10L 19/167* (2013.01); *H04R 3/00* (2013.01); *H04R 2420/07* (2013.01)

(58) Field of Classification Search
CPC ............................ G10L 21/04; G10L 19/167
USPC .............................. 381/22, 23; 704/211, 201
See application file for complete search history.

(56) References Cited

U.S. PATENT DOCUMENTS

| 9,461,900 | B2 | 10/2016 | Kim et al. |
|---|---|---|---|
| 9,508,355 | B2 | 11/2016 | Lee et al. |
| 10,224,040 | B2 | 3/2019 | Huang et al. |
| 10,424,306 | B2 | 9/2019 | Greer et al. |
| 2012/0265523 | A1 | 10/2012 | Greer et al. |
| 2014/0146695 | A1 | 5/2014 | Kim et al. |
| 2014/0163999 | A1 | 6/2014 | Lee et al. |
| 2015/0228291 | A1 | 8/2015 | Greer et al. |

(Continued)

FOREIGN PATENT DOCUMENTS

| JP | 2006-333224 A | 12/2006 |
|---|---|---|
| KR | 10-2004-0050810 A | 6/2004 |
| WO | 2017/055091 A1 | 4/2017 |

OTHER PUBLICATIONS

International Search Report dated Jun. 1, 2020.
European Search Report dated Dec. 23, 2021.

*Primary Examiner* — George C Monikang
(74) *Attorney, Agent, or Firm* — Cha & Reiter, LLC

(57) ABSTRACT

Disclosed is an electronic device including a speaker, a communication circuit, a processor, and a memory. The processor is configured to receive first data including a first audio frame corresponding to a first interval and a second audio frame corresponding to a second interval subsequent to the first interval, using the communication circuit, to store the second audio frame in the memory in response to reception of the first data, to output a first audio signal generated based on the first audio frame, through the speaker, and to store the third audio frame in the memory and output a second audio signal generated based on the second audio frame of the second data through the speaker when second data including the second audio frame and a third audio frame corresponding to a third interval subsequent to the second interval is received using the communication circuit.

20 Claims, 12 Drawing Sheets

(56) References Cited

U.S. PATENT DOCUMENTS

| | | |
|---|---|---|
| 2016/0148618 A1 | 5/2016 | Huang et al. |
| 2016/0196827 A1 | 7/2016 | Greer et al. |
| 2017/0148448 A1 | 5/2017 | Greer et al. |
| 2017/0187635 A1 | 6/2017 | Subasingha et al. |
| 2018/0026746 A1 | 1/2018 | Bruhn et al. |
| 2018/0343086 A1 | 11/2018 | Bruhn et al. |

METHOD FOR PROCESSING AUDIO DATA AND ELECTRONIC DEVICE THEREFOR

CROSS-REFERENCE TO RELATED APPLICATION(S)

This application is based on and claims priority under 35 U.S.C. § 119 to Korean Patent Application No. 10-2019-0019112, filed on Feb. 19, 2019, in the Korean Intellectual Property Office, the disclosure of which is incorporated by reference herein its entirety.

BACKGROUND

1. Field

The instant disclosure generally relates to a method for processing audio data and an electronic device therefor.

2. Description of Related Art

Various electronic devices may be connected to each other based on various communication specifications. For example, an electronic device may be connected to an external electronic device based communication specifications such as Bluetooth or Bluetooth low energy (BLE). When connected, the electronic device (e.g., car kit or artificial intelligence (AI) speaker) may make a voice call using the connected external electronic device (e.g. mobile phone). For the purpose of making the voice call, the electronic device may transmit voice of the user received through a microphone to the mobile phone and may receive voice data received from the cellular network through the mobile phone. As such, the electronic device may transmit and receive encoded audio data with the external electronic device (e.g., mobile phone) based on a particular communication specification.

When the electronic device transmits audio data to the external electronic device, the electronic device may encode audio data based on the particular specification used to connect to the external electronic device. For example, when the electronic device is connected to the external electronic device based on the Bluetooth or BLE specification, the electronic device may encode audio data using one of various speech codecs defined in the Bluetooth or BLE specification. And more specifically, the electronic device may encode the audio data using modified subband coding (mSBC) codec widely used in the Bluetooth or BLE specification.

The above information is presented as background information only to assist with an understanding of the disclosure. No determination has been made, and no assertion is made, as to whether any of the above might be applicable as prior art with regard to the disclosure.

SUMMARY

Electronic devices may transmit audio data using packets defined based on the Bluetooth or BLE specification. For example, when using the mSBC codec, one such electronic device may generate a bit-stream by encoding the audio data at a compression rate of 64 kbps. The electronic device may divide the bit-stream into sizes corresponding to specified time intervals and may transmit data packets of the divided bit-stream at specified times.

For example, the electronic device may divide the bit-stream of audio data into frames of 7.5 ms and may transmit data packets including the divided frames after elapse of a specified time period (e.g., 7.5 ms). These time periods may be referred to as cycles. The receiving electronic device may receive the data packet at the beginning or the end of a particular cycle and may decode and play the frame included in the received packet in real time. In this case, because the length of the frame of audio data received at a cycle is equal to the length of the time period, the receiving electronic device may not be able to separately buffer the audio data. Accordingly, when a data packet is lost at a cycle, the receiving electronic device may be disconnected. For example, loss of data packets may occur due to interference in the communication channels used by the electronic devices.

Aspects of the disclosure are to address at least the above-mentioned problems and/or disadvantages and to provide at least the advantages described below.

In accordance with an aspect of the disclosure, an electronic device may include a speaker, a communication circuit, a processor operatively connected to the communication circuit, and a memory operatively connected to the processor. The memory may store one or more instructions that, when executed, cause the processor to receive first data including a first audio frame corresponding to a first interval and a second audio frame corresponding to a second interval subsequent to the first interval, using the communication circuit, to store the second audio frame in the memory in response to reception of the first data, to output a first audio signal generated based on the first audio frame, through the speaker, to store the third audio frame in the memory and output a second audio signal generated based on the second audio frame of the second data through the speaker when second data including the second audio frame and a third audio frame corresponding to a third interval subsequent to the second interval is received using the communication circuit, and to output the second audio signal generated based on the second audio frame of the first data stored in the memory, through the speaker when at least part of the second data is not received using the communication circuit.

In accordance with another aspect of the disclosure, an electronic device may include a communication circuit, a processor operatively connected to the communication circuit, and a memory operatively connected to the processor. The memory may store instructions that, when executed, cause the processor to obtain audio data, to encode the audio data using a specified codec to generate a plurality of frames each having a size corresponding to a single connection interval; and to transmit a first data packet including a first frame and a second frame subsequent to the first frame among the plurality of frames to an external electronic device in a first connection interval.

In accordance with another aspect of the disclosure, an electronic device may include a communication circuit, a processor operatively connected to the communication circuit, and a memory operatively connected to the processor. The memory may store one or more instructions that, when executed, cause the processor to obtain audio data, to encode the audio data using a specified codec to generate a plurality of frames each having a size corresponding to a single connection interval, and to transmit a first data packet including two or more frames among the plurality of frames to an external electronic device at a first specified time interval, using the communication circuit. A second data packet transmitted in a second specified time interval may include at least one frame that is same as one of the two or more frames included in the first data packet transmitted in the first specified time interval preceding the second specified time interval.

In accordance with another aspect of the disclosure, a data transmitting method of an electronic device may include obtaining audio data, encoding the audio data using a specified codec to generate a plurality of frames each having a size corresponding to a single connection interval, transmitting a first data packet including a first frame and a second frame subsequent to the first frame among the plurality of frames to an external electronic device in a first connection interval, and transmitting a second data packet including the second frame and a third frame subsequent to the second frame to the external electronic device in a second connection interval subsequent to the first connection interval.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure may be described with reference to accompanying drawings. The embodiments and terms used with regard to the embodiments are not intended to limit the technology described herein to specific embodiments, and should be understood to include various modifications, equivalents, and/or alternatives of the embodiments.

Figure 1:
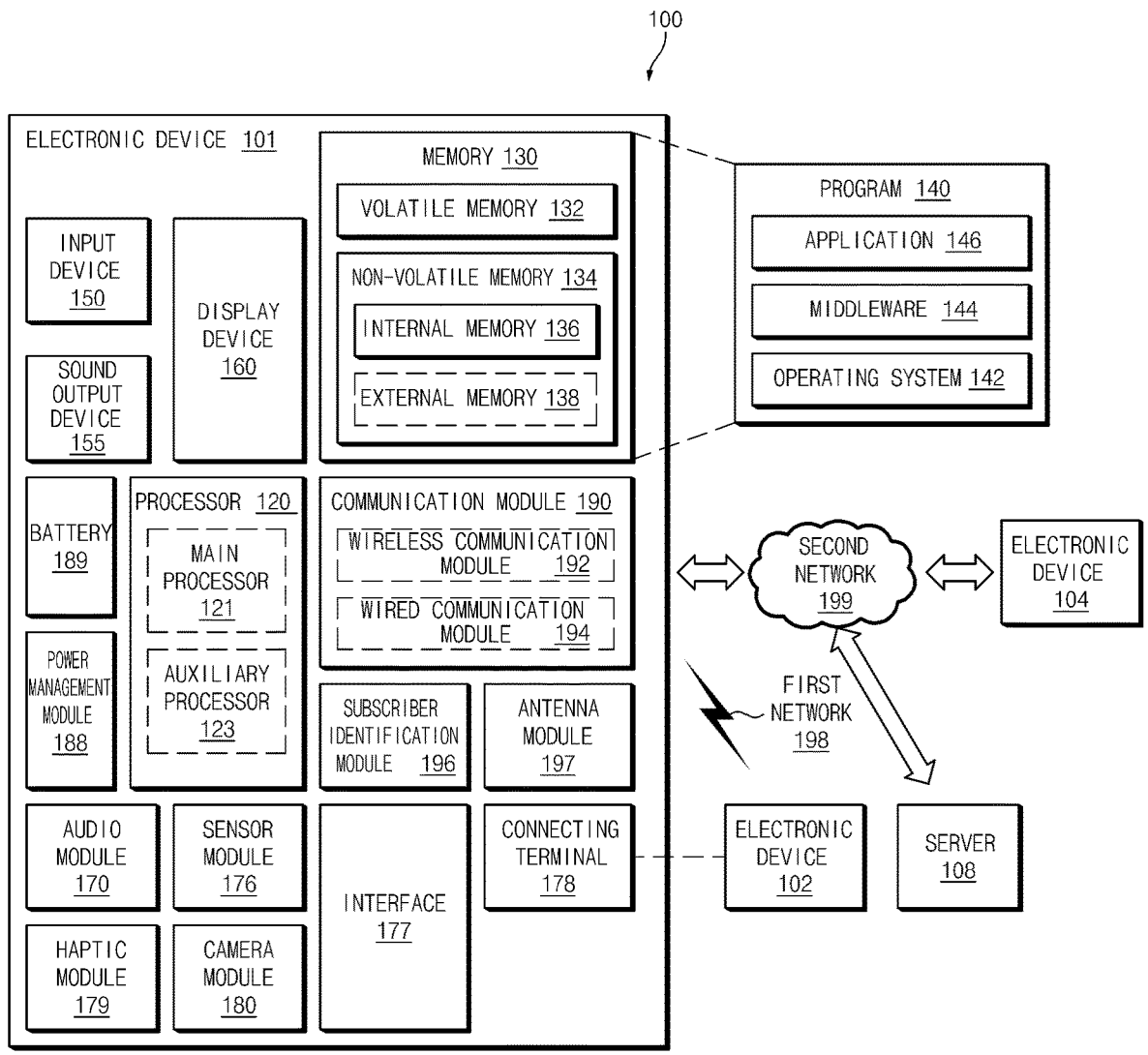
FIG. 1 is a block diagram illustrating an electronic device in a network, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an 'image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, the electronic device 101 may include at least part of the components of the electronic device 101 illustrated in FIG. 1. According to an embodiment, the electronic device 101 may include the communication module 190, the processor 120 operatively connected to the communication module 190, and a memory 130 operatively connected to the processor 120. For example, the memory 130 may store instructions that, when executed, cause the processor 120 to perform the operations of the electronic device 101 to be described later. According to an embodiment, the electronic device 101 may further include a configuration not illustrated in FIG. 1. For example, the electronic device 101 may further include housing that accommodates at least part of the configurations of the electronic device 101.

Figure 2:
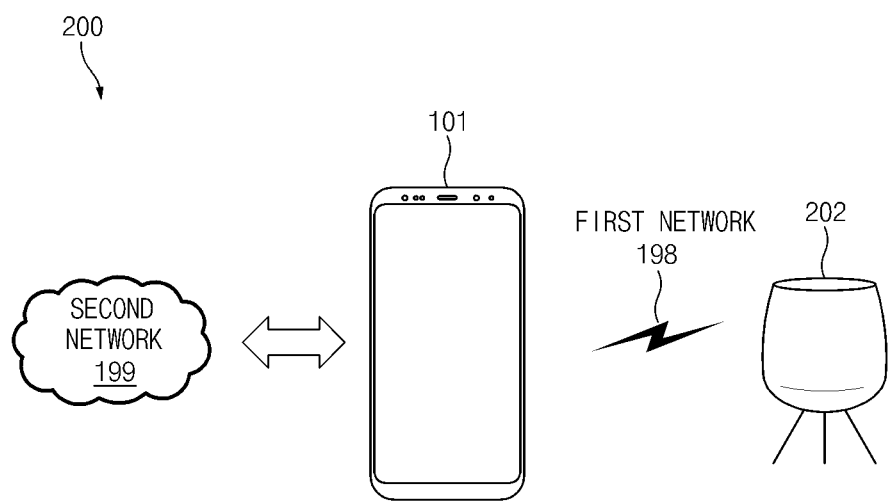
FIG. 2 is a view illustrating a communication environment of an electronic device, according to an embodiment.

FIG. 2 is a view illustrating a communication environment 200 of the electronic device 101, according to an embodiment.

According to an embodiment, the electronic device 101 may communicate with another electronic device (e.g., the electronic device 104 or the server 108 of FIG. 1, not shown) through the second network 199. According to an embodiment, the electronic device 101 may perform communication through the second network 199, using at least one communication circuit (e.g., the communication module 190 of FIG. 1). For example, the electronic device 101 may perform long range wireless communication through the second network 199 (e.g., long range wireless communication networks such as cellular network, Internet, or computer network (e.g., LAN or WAN)).

According to an embodiment, the electronic device 101 may communicate with the external electronic device 202 (e.g., the electronic device 102 of FIG. 1), using short range wireless communication (e.g., the first network 198). According to an embodiment, the electronic device 101 may communicate with the external electronic device 202, using at least one communication circuit (e.g., the communication module 190 of FIG. 1). For example, the electronic device 101 may communicate with the external electronic device 202 based on a specified communication specification (e.g., Wi-Fi, Bluetooth, BLE, Zigbee, or neighbor awareness network (NAN)), using at least one communication circuit.

According to an embodiment, the electronic device 101 may communicate with the external electronic device 202 based on the Bluetooth communication specification. For example, the electronic device 101 may be an electronic device paired with the external electronic device 202. For example, the electronic device 101 may be connected to the paired external electronic device 202 and may transmit or receive data through the connection with the external electronic device 202.

According to an embodiment, the electronic device 101 may transmit data obtained from the second network 199 to the external electronic device 202. The electronic device 101 may receive data packets of a particular communication protocol associated with the second network 199 and may transmit at least part of the received data packets to the external electronic device 202. For example, the electronic device 101 may generate data packets of a communication protocol associated with the first network 198, using at least part of the received data packets, and may transmit the generated data packets to the external electronic device 202.

According to an embodiment, the electronic device 101 may transmit the data obtained by the electronic device 101 itself to the external electronic device 202. For example, the electronic device 101 may obtain audio data using an equipped microphone (e.g., the input device 150 of FIG. 1) and may generate data packets of a communication protocol associated with the first network 198 based on the obtained data. The electronic device 101 may then transmit the generated data packets to the external electronic device 202.

According to an embodiment, the electronic device 101 may receive data from the external electronic device 202. For example, the electronic device 101 may receive data from the external electronic device 202 via the first network 198. The electronic device 101 may transmit the received data through the second network 199. The electronic device 101 may obtain audio data from the received data and may output an audio signal corresponding to the audio data, using a speaker (e.g., the sound output device 155 of FIG. 1).

According to an embodiment, the external electronic device 202 may be an electronic device that is similar to the electronic device 101. For example, the external electronic device 202 may be an AI speaker having a configuration similar to that of the electronic device 101. In FIG. 2, the electronic device 101 is illustrated as a mobile phone; and the external electronic device 202 is illustrated as an AI speaker; however, embodiments of the disclosure are not limited thereto.

Hereinafter, it may be assumed that the electronic device 101 transmits and receives data packets including audio data to and from the external electronic device 202, using Bluetooth communication. Bluetooth communication is exemplary, and the electronic device 101 may communicate with the external electronic device 202 using various short range communications. For convenience of description, in the described embodiments the electronic device 101 transmits data packets to the external electronic device 202, but embodiments of the instant disclosure are not so limited. In an alternative embodiment, the external electronic device 202 may transmit data packets to the electronic device 101.

Figure 3:
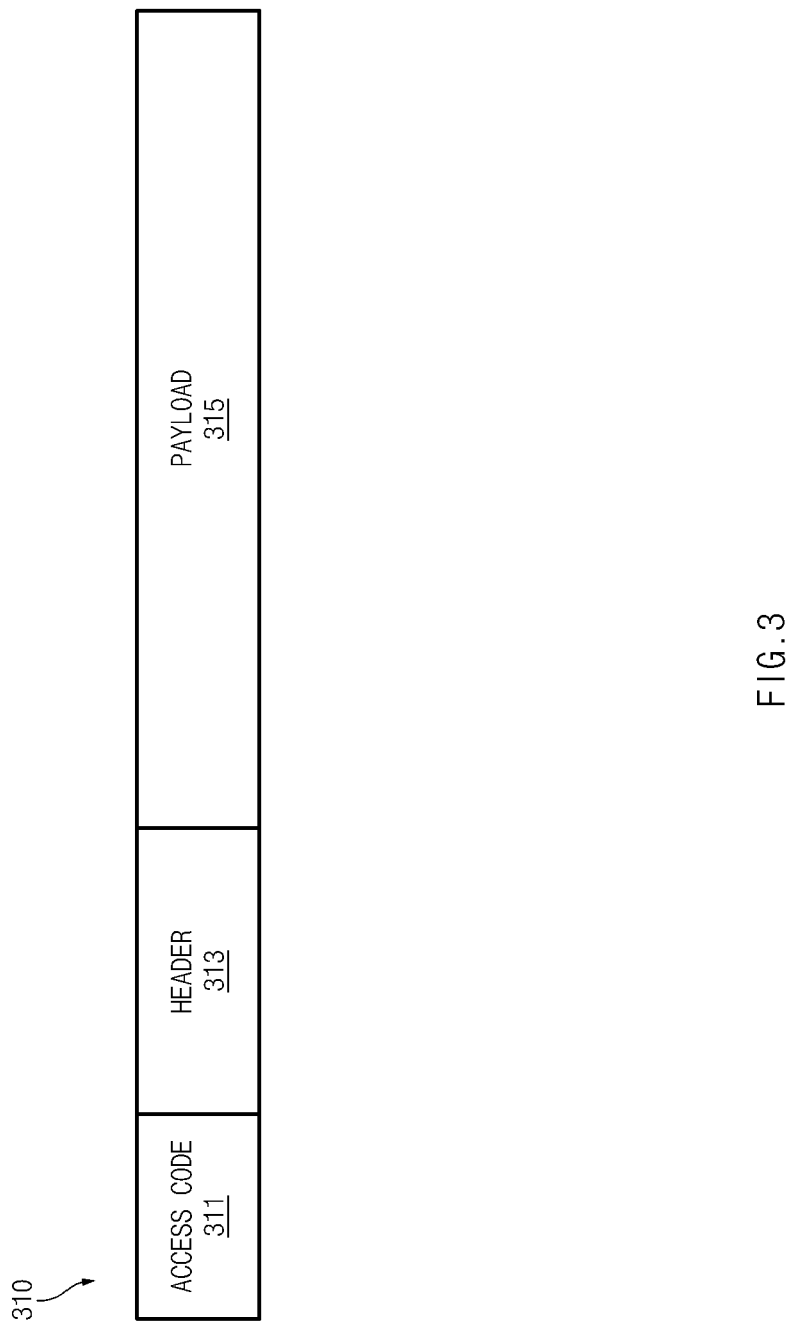
FIG. 3 is a block diagram illustrating the structure of a basic rate packet, according to an embodiment.

FIG. 3 is a block diagram illustrating the structure of a basic rate packet 310, according to an embodiment.

When the electronic device 101 transmits a data packet to the external electronic device 202 based on the Bluetooth communication specification, the electronic device 101 may use a basic rate packet. FIG. 3 illustrates the general format of such a packet 310.

According to an embodiment, the basic rate packet 310 may include an access code 311, a header 313, and a payload 315. The structure of the basic rate packet 310 illustrated in FIG. 3 is exemplary, and the packet structure of the instant disclosure is not so limited. For example, in other alternative embodiments, the basic rate packet 310 may include only the access code 311 or only the access code 311 and the header 313.

According to an embodiment, the access code 311 may have length of 72 or 68 bits. The access code 311 may be used for synchronization, direct current (DC) offset compensation, and/or packet identification. The access code 311 may be used to identify all packets exchanged on a physical channel. For example, the packets transmitted on the same physical channel may include the same access code 311.

Figure 5:
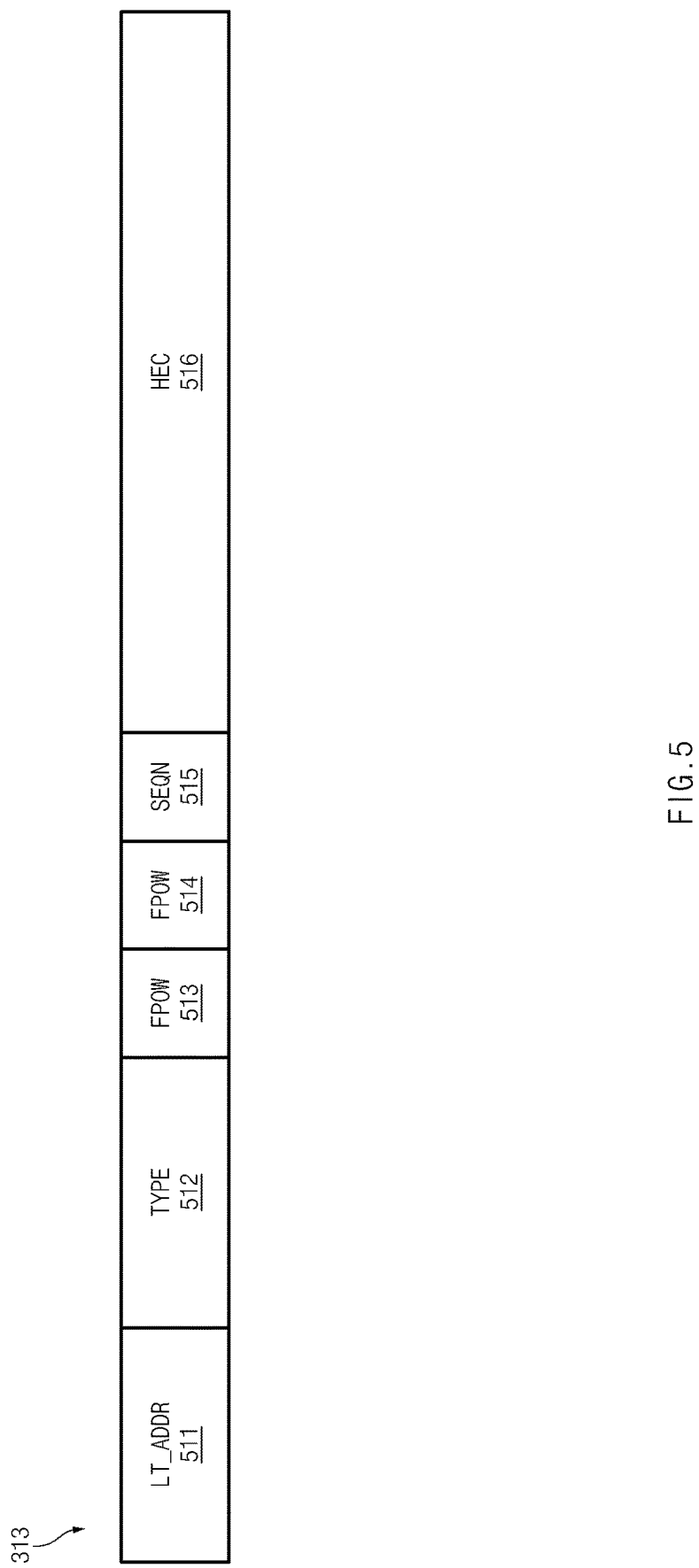
FIG. 5 is a block diagram illustrating a header structure, according to an embodiment.

According to an embodiment, the header 313 may have length of 54 bits and may be the header of the packet. Referring to FIG. 5, the header 313 may include a logical transport address (LT ADDR) 511, a TYPE 512, a FLOW 513, an automatic repeat request number (ARQN) 514, a sequence number (SEQN) 515, and a header error check (HEC) 516.

For example, the LT ADDR 511 may include the logical transport address of the corresponding packet (e.g., the basic rate packet 310 of FIG. 3). The LT ADDR 511 may include the address of the logical transport channel of a destination or a source, depending on the slot in which the packet is transmitted.

For example, the TYPE 512 may indicate the type of the corresponding packet. For example, the TYPE 512 may indicate whether the packet is transmitted through synchronous connection oriented link (SCO) logical transport, enhanced SCO (eSCO) logical transport, asynchronous connection-less (ACL) logical transport, or connectionless slave broadcast (CSB) logical transport. In one embodiment, the TYPE 512 may indicate whether the packet is an SCO packet, an eSCO packet, or an ACL packet.

For example, the FLOW 513 may be used for flow control of packets transmitted on the ACL logical transport. The FLOW 513 may not be used on the eSCO logical transport.

For example, the ARQN 514 may indicate whether the payload data is successfully transmitted to the transmitting device. For example, when the previously received payload data is successfully received, the electronic device 101 may include information indicating acknowledgment in the ARQN 514. In another example, when the previously received payload data is not successfully received, the electronic device 101 may include information indicating negative acknowledgment negative-ACK in the ARQN 514.

For example, the SEQN 515 may include information indicating the order of data packet streams.

For example, the HEC 516 may be used to identify one or more errors of the header 313. Thus, the receiving device may identify the integrity of the header 313, using the HEC 516 of the header 313 of the received packet.

Returning to FIG. 3, the payload 315 may include information to be transmitted by the transmitting device. For example, the payload 315 may include audio data, such as audio data encoded into packets. The payload 315 may have length of 0 to 2790 bits.

Figure 4:
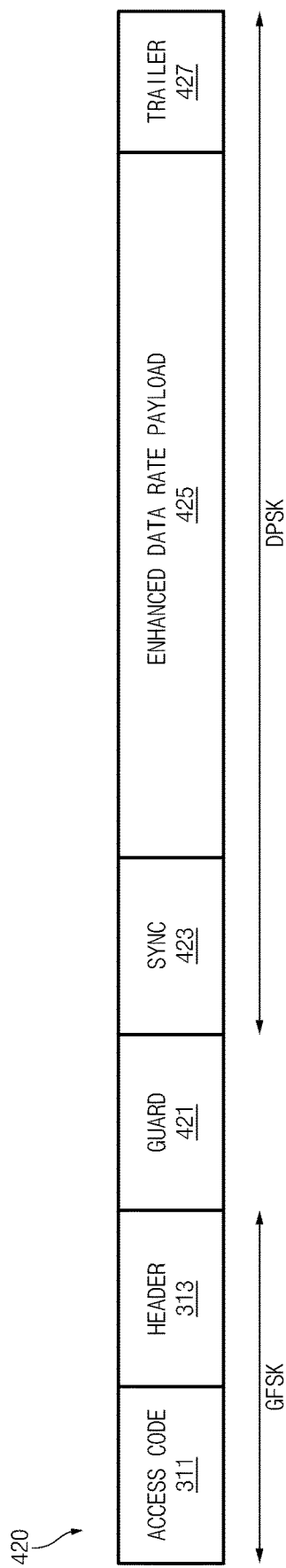
FIG. 4 is a block diagram illustrating a structure of an enhanced data rate packet, according to an embodiment.

FIG. 4 is a block diagram illustrating the structure of an enhanced data rate packet 420, according to an embodiment.

When the electronic device 101 transmits data packets to the external electronic device 202 based on the Bluetooth communication specification, the electronic device 101 may use the enhanced data rate packet format 420 as shown in FIG. 4.

According to an embodiment, the enhanced data rate packet 420 may include an access code 311, a header 313, a guard 421, a sync 423, an enhanced data rate payload 425, and a trailer 427. For example, the access code 311 and the header 313 may be modulated based on Gaussian frequency-shift keying (GFSK). The sync 423, the enhanced data rate payload 425, and the trailer 427 may be modulated based on differential phase-shift keying (DPSK). For example, the guard 421 may be positioned between the end of the GFSK symbol of the header 313 and the start of the synchronization sequence (e.g., the sync 423) of the header 313. The sync 423 may include synchronization sequence information for synchronization. The enhanced data rate payload 425 may include information to be transmitted by the transmitting device (e.g. the electronic device 101). For example, the trailer 427 may include a plurality of 0 bits.

Returning to FIG. 2, according to an embodiment, the electronic device 101 may obtain audio data and may generate a bit-stream by encoding the audio data using a specified codec. For example, the electronic device 101 may encode the audio data using an audio codec associated with the first network 198. According to an embodiment, the electronic device 101 may encode the audio data using an audio codec defined in the Bluetooth communication specification. For example, the electronic device 101 may generate a bit-stream by encoding the audio data using the modified sub band codec (mSBC).

According to an embodiment, the electronic device 101 may divide the bit-stream into a plurality of frames with sizes corresponding to a specified time interval. For example, the electronic device 101 may generate a frame such that the length of audio data corresponding to the frame is the length of a connection interval of the Bluetooth communication specification. For example, the length of the connection interval may be about 7.5 milliseconds (ms).

According to an embodiment, the electronic device 101 may transmit data packets including the plurality of frames to the external electronic device 202. For example, the electronic device 101 may transmit a data packet in each connection interval. The electronic device 101 may modulate at least one frame depending on the type of the data packet and may transmit the data packet, in which the modulated frame is included as the payload, to the external electronic device 202. For example, the type of data packet may be indicated by its header (e.g., the header 313 of FIG. 3). Specifically, the type of data packet may be indicated by the TYPE 512 of the header.

Figure 6:
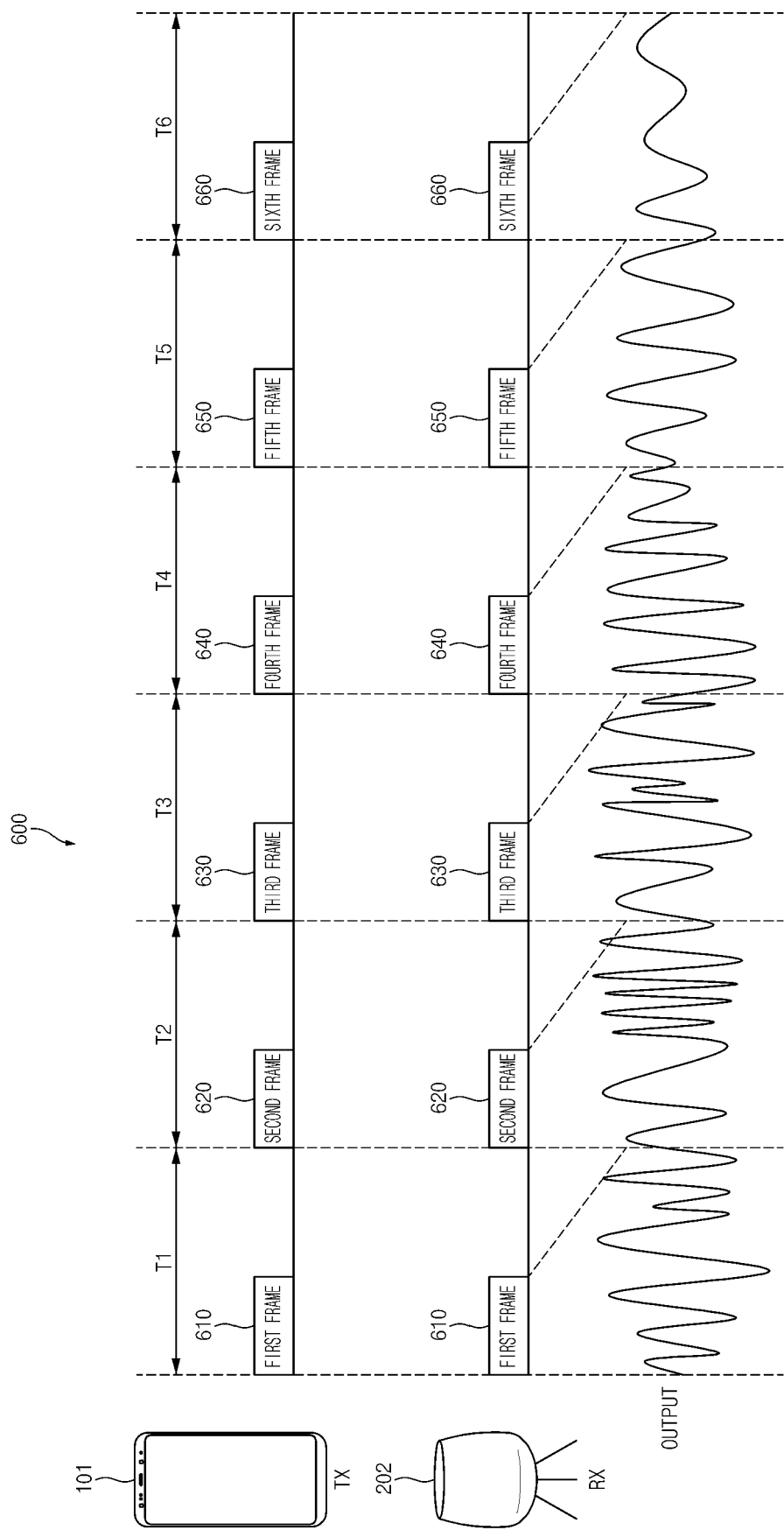
FIG. 6 is a diagram illustrating audio data transmission, according to an embodiment.
Figure 7:
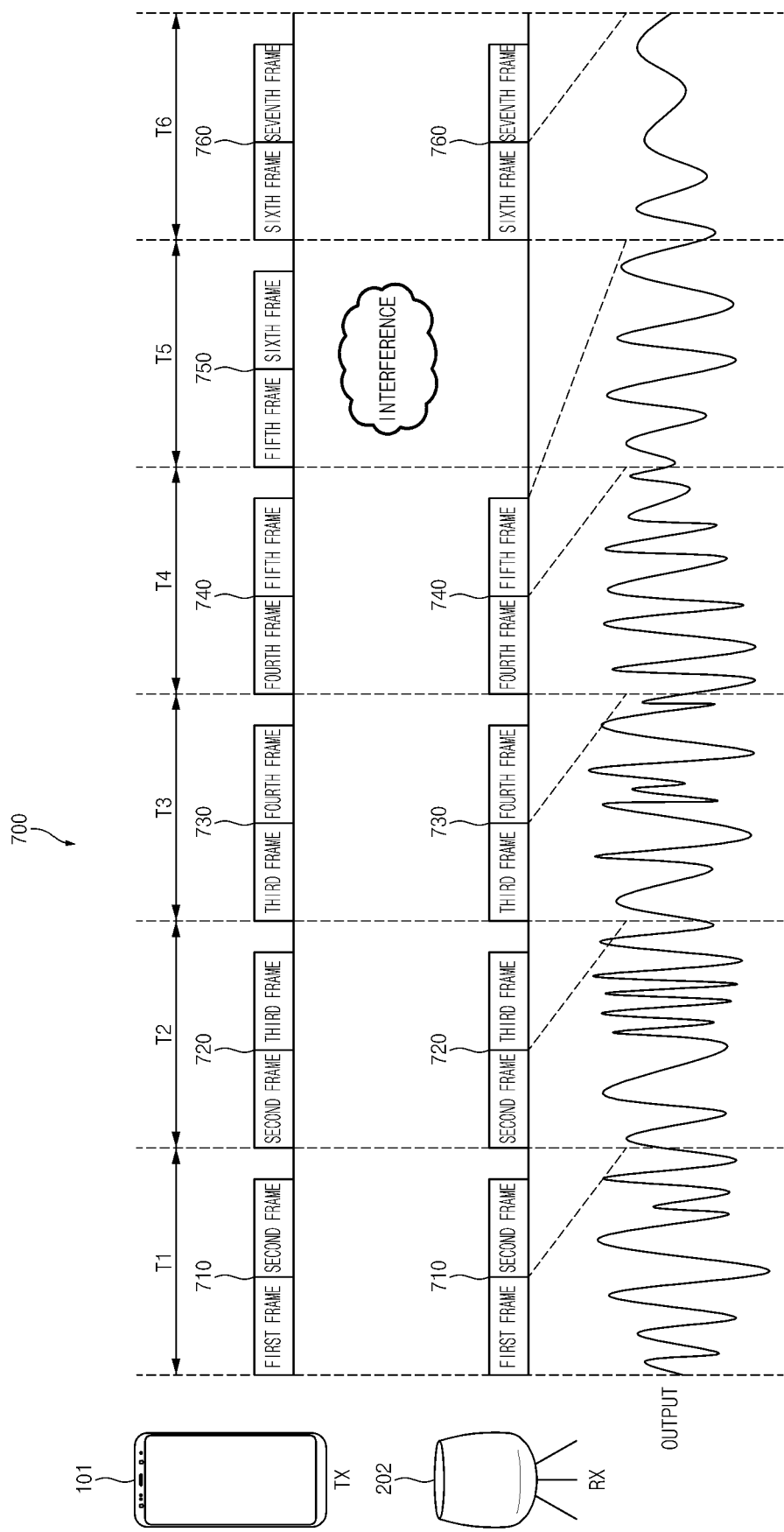
FIG. 7 is a diagram illustrating transmission of data packets including a plurality of frames, according to an embodiment.
Figure 8:
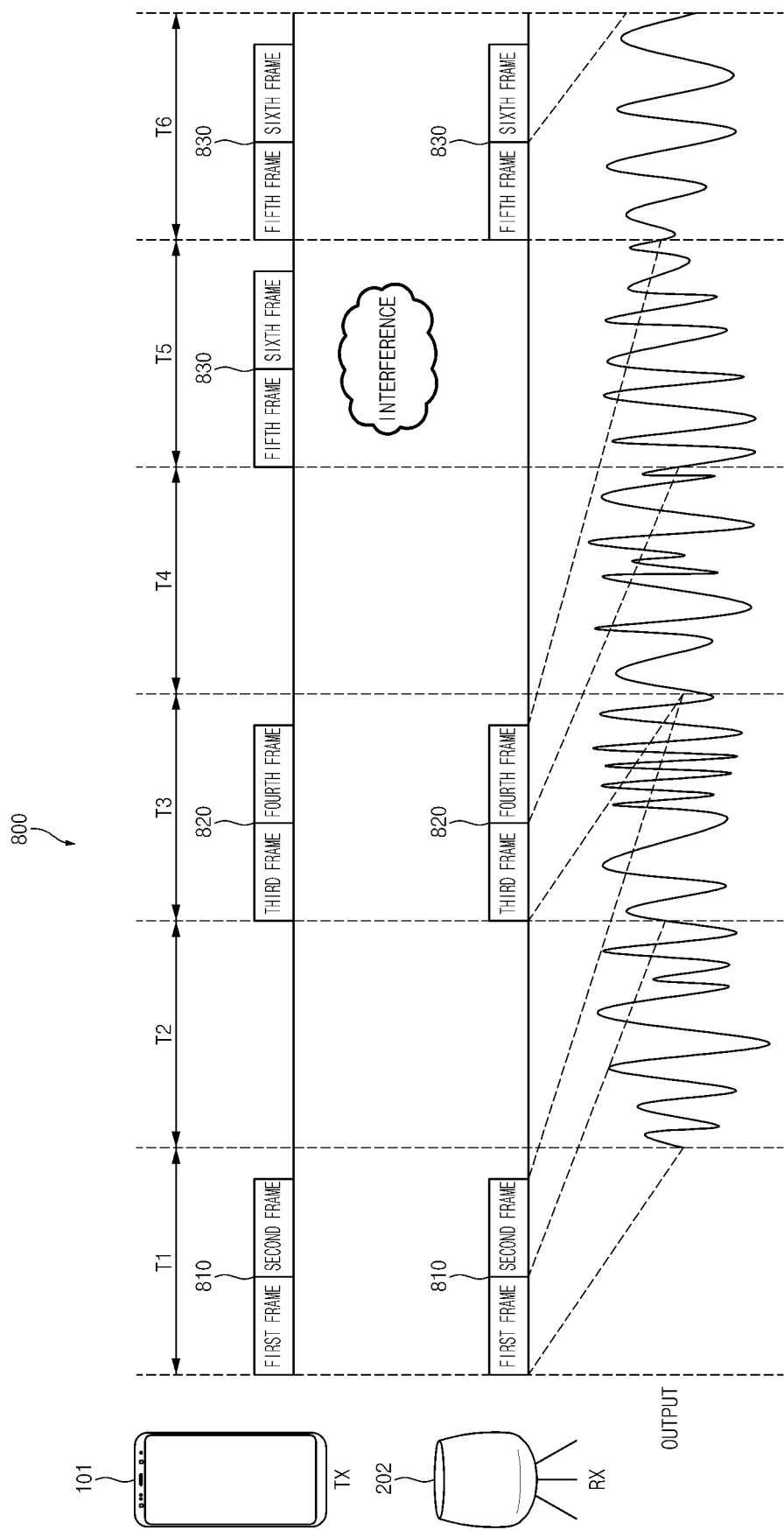
FIG. 8 is a diagram illustrating retransmission of a data packet based on a traffic margin, according to an embodiment.

Hereinafter, the data transmitting methods of the electronic device 101 will be described with reference to FIGS. 6 to 8. In FIGS. 6 to 8, for convenience of description, the delay between the transmitter (e.g., the electronic device 101) and the receiver (e.g., the external electronic device 202) may be negligible and thus ignored. However, in real life scenarios, there may be a delay between the transmitter and the receiver.

FIG. 6 is a diagram illustrating audio data transmission 600, according to an embodiment.

Referring to FIG. 6, the electronic device 101 may transmit a data packet to the external electronic device 202 in each of a first connection interval T1, a second connection interval T2, a third connection interval T3, a fourth connection interval T4, a fifth connection interval T5, and a sixth connection interval T6. For example, a first data packet 610 may include a first frame; a second data packet 620 may include a second frame; a third data packet 630 may include a third frame; a fourth data packet 640 may include a fourth frame; a fifth data packet 650 may include a fifth frame; and a sixth data packet 660 may include a sixth frame.

According to an embodiment, the electronic device 101 may generate a plurality of frames by encoding audio data into the frames using the specified codec. For example, the electronic device 101 may generate a frame having a specified size from audio data using a codec with a compression rate of 32 kbps. In another example, the electronic device 101 may generate frames with sizes corresponding to a connection interval.

According to an embodiment, the size of the frame may be determined based on the length of the connection interval. For example, the length of the connection interval may be 7.5 ms. Then when the electronic device 101 uses the 32 kbps compression rate codec, the size of each frame may be 30 bytes.

According to an embodiment, the electronic device 101 may generate a data packet for each of the generated frame. For example, the electronic device 101 may generate a data packet that includes a generated frame in its payload. The electronic device 101 may generate a data packet by modulating data including a frame depending on a specified packet type.

According to an embodiment, the electronic device 101 may transmit and receive audio data using a profile, which is set to transmit and receive the audio data, or logical transport. For example, the electronic device 101 may transmit and receive the audio data, using SCO logical transport or eSCO logical transport. The SCO logical transport may be point-to-point transport between a master and a specific slave, which are symmetric. The eSCO logical transport may be point-to-point transport between a master and a specific slave.

According to an embodiment, the electronic device 101 may transmit and receive audio data, using data packets of the type used in the eSCO logical transport. For example, the electronic device 101 may transmit and receive audio data using extended voice 3 (EV3) packets capable of transmitting 30 bytes in a connection interval.

In the embodiment of FIG. 6, the electronic device 101 may encode audio data, using an audio codec having compression rate of 32 kbps. In this case, the generated frames are smaller than those of conventional mSBC codec having compression rate of 64 kbps. When the electronic device 101 transmits one frame in each connection interval, the traffic margin may be increased as compared to using the mSBC codec. Due to the increase in the traffic margin, the electronic device 101 may perform communication that is more robust to external interference.

In the embodiment of FIG. 6, for example, the electronic device 101 may transmit and receive audio data using EV3 packets capable of transmitting 30 bytes per connection interval instead of 2-EV3 packets capable of transmitting 60 bytes per connection interval. The electronic device 101 may increase the signal-to-noise ratio (SNR) at the receiver of the data packet by transmitting and receiving audio data using the EV3 packets instead of the 2-EV3 packets.

According to an embodiment, due to the increased traffic margin, the electronic device 101 may be able to retransmit lost packets. For example, a data packet transmitted by the electronic device 101 may be lost due to various reasons such as external interference. In this example, when it is determined that a data packet transmitted within a particular connection interval is lost, the electronic device 101 may retransmit the data packet in the traffic margin within the same connection interval. For example, the fifth data packet 650 transmitted in the fifth connection interval may be lost. In this case, the electronic device 101 is able to retransmit the fifth data packet 650 within the fifth connection interval, because there is sufficient traffic margin in the fifth connection interval. For example, the electronic device 101 may retransmit the fifth data packet 650 to the external electronic device 202 using the traffic margin within the connection interval generated due to the use of the codec with increased compression rate (e.g., 32 kbps). According to an embodiment, when a negative acknowledgment NACK for a data packet transmitted within the connection interval is received from the external electronic device 202 or an acknowledgment ACK is not received, the electronic device 101 may perform retransmission of the data packet within the same connection interval.

According to an embodiment, the external electronic device 202 may output an audio signal corresponding to the received data packets. For example, the external electronic device 202 may receive the first data packet 610 including the first frame in the first connection interval T1 and may output the signal corresponding to the first frame during the time corresponding to the first connection interval T1, using audio data corresponding to the first frame included in the first data packet. For example, the external electronic device 202 may demodulate the first data packet 610 to obtain the encoded audio data (e.g., the first frame) and may decode the encoded audio data to output the audio signal. In the embodiment of FIG. 6, the external electronic device 202 may output the audio signal using real-time decoding.

FIG. 7 is a diagram illustrating transmission 700 of data packets including a plurality of frames, according to an embodiment.

Referring to FIG. 7, the electronic device 101 may transmit a first data packet 710 including a first frame and a second frame in the first connection interval T1; the electronic device 101 may transmit a second data packet 720 including the second frame and a third frame in the second connection interval T2; the electronic device 101 may transmit a third data packet 730 including the third frame and a fourth frame in the third connection interval T3; the electronic device 101 may transmit a fourth data packet 740 including the fourth frame and a fifth frame in the fourth connection interval T4; the electronic device 101 may transmit a fifth data packet 750 including the fifth frame and a sixth frame in the fifth connection interval T5; and the electronic device 101 may transmit a sixth data packet 760 including the sixth frame and a seventh frame in the sixth connection interval T6.

According to an embodiment, the electronic device 101 may generate a plurality of frames by encoding audio data into frames using a specified codec. For example, the electronic device 101 may generate frames having specified sizes from the audio data using the codec having compression rate of 32 kbps. For example, the electronic device 101 may generate frames having sizes corresponding to the connection interval. The length of the connection interval may be 7.5 ms.

According to an embodiment, the electronic device 101 may generate data packets each including the generated plurality of frames. For example, the electronic device 101 may generate a data packet that includes a plurality of frames in this payload. For example, the electronic device 101 may transmit a plurality of frames as one packet, using the 2-EV3 type packet used in eSCO logical transport. As such, the 2-EV3 packet may include two frames and would enable transmission of 60 bytes per connection interval.

According to an embodiment, the data packet transmitted by the electronic device 101 may include audio data corresponding to a plurality of connection intervals. As shown in FIG. 7, the electronic device 101 may transmit a data packet including the previously transmitted frame and a frame subsequent to the previously transmitted frame. For example, in the second connection interval T2, the electronic device 101 may transmit, to the external electronic device 202, the second data packet 720 which includes the second frame transmitted in the first connection interval T1 and the third frame subsequent to the second frame.

For example, when the electronic device 101 uses an audio codec having compression rate of 32 kbps, the electronic device may transmit a 2-EV3 type data packet that includes two frames each having a size of 30 bytes in a single connection interval. Also, one of the frames may be a frame transmitted in the previous connection interval. In this case, the electronic device 101 may effectively transmit most of the frames twice to the external electronic device 202.

According to an embodiment, the external electronic device 202 may obtain two frames consecutively in time from a single data packet. For example, the external electronic device 202 may obtain two frames consecutively in time by demodulating the received data packet. The external electronic device 202 may output an audio signal by decoding the preceding frame among the two frames and may buffer the subsequent frame. For example, the external electronic device 202 may output the audio signal in a time interval corresponding to the connection interval using the preceding frame among the plurality of frames of the data packet received in the connection interval. The external electronic device 202 may further buffer the subsequent frame among the plurality of frames of the data packet received in the connection interval.

Referring to FIG. 7, for example, the external electronic device 202 may receive a fourth data packet 740 including the fourth frame and the fifth frame in the fourth connection interval T4. According to an embodiment, the external electronic device 202 may decode the fourth frame of the received fourth data packet 740 to output an audio signal corresponding to the fourth frame in a time interval corresponding to the fourth connection interval T4. The external electronic device 202 may buffer the fifth frame of the received fourth data packet 740. In the fifth connection interval T5, the fifth data packet 750 transmitted by the electronic device 101 may not be successfully received by the external electronic device 202 due to interference. For example, the fifth data packet 750 may be lost. In this case, the external electronic device 202 may output audio data in a time interval corresponding to the fifth connection interval T5, using the fifth frame of the buffered fourth data packet 740. Accordingly, despite the loss of the fifth data packet 750, the external electronic device 202 may seamlessly output the audio signal using the buffered fifth frame.

In the example shown in FIG. 7, the data packet includes two frames, but embodiments of the disclosure are not so limited. In alternative embodiments, the data packet may include any number of frames. For example, the receiver (e.g., the external electronic device 202) may decode and output one frame among the received plurality of frames and may buffer the remaining frames to prepare for packet loss. As such, the external electronic device 202 may improve unwanted muting of the audio by buffering a part of the plurality of frames.

According to an embodiment, the external electronic device 202 may transmit a request for retransmission to the electronic device 101 when there are no buffered frames. For example, when the request for the retransmission is received, the electronic device 101 may retransmit the previously transmitted data packet. Accordingly, the electronic device 101 may reduce consumption of wireless resources due to the retransmission, because retransmission is only required when the buffered frames are exhausted.

FIG. 8 is a diagram illustrating retransmission 800 of a data packet based on a traffic margin, according to an embodiment.

Referring to FIG. 8, according to an embodiment, the electronic device 101 may transmit a data packet including a plurality of frames in a time period corresponding to the plurality of frames. For example, the electronic device 101 may transmit a first data packet 810 including a first frame and a second frame in a first connection interval T1; the electronic device 101 may transmit a second data packet 820 including a third frame and a fourth frame in a third connection interval T3; the electronic device 101 may transmit a third data packet 830 including a fifth frame and a sixth frame in a fifth connection interval T5. Thus, in this example, when the data packet includes two frames, the electronic device 101 may be configured to transmit the data packet for each even-numbered or odd-numbered connection interval.

According to an embodiment, the electronic device 101 may generate a plurality of frames by encoding audio data into frames using the specified codec. For example, the electronic device 101 may generate frames having specified sizes from the audio data using the codec having compression rate of 32 kbps. For example, the electronic device 101 may generate frames of sizes corresponding to a connection interval. For example, the length of the connection interval may be 7.5 ms. For example, the electronic device 101 may transmit a plurality of frames as one packet, where the packet is the 2-EV3 type used in eSCO logical transport.

According to an embodiment, the data packet transmitted by the electronic device 101 may include audio data corresponding to a plurality of connection intervals. For example, the electronic device 101 may transmit a data packet including a plurality of frames that are sequential in time. For example, in the first connection interval T1, the electronic device 101 may transmit, to the external electronic device 202, the first data packet 810 including the first frame and the second frame subsequent to the first frame.

According to an embodiment, the state of the electronic device 101 may be transitioned to a first state (e.g., a wake-up state or an active state) in the connection interval in which the data packet is transmitted, and then the electronic device 101 may transmit a data packet; after the transmission of the data packet, the state of the electronic device 101 may be transitioned to a second state (e.g., a sleep state or an inactive state) until the transmission of the next data packet. For example, the state of the electronic device 101 may be transitioned to the first state in the first connection interval T1, and then the electronic device 101 may transmits the first data packet 810; and then, the state of the electronic device 101 may be transitioned to the second state in the second connection interval T2. Because the electronic device 101 does not need to be maintained in the first state in each connection interval, the power consumption of the electronic device 101 may be reduced. Furthermore, because the electronic device 101 transmits data in a time divisional manner, that is, not transmitting data in each connection interval, the electronic device 101 may reduce the interference with other wireless communication (e.g., Wi-Fi communication) using time division communication.

According to an embodiment, the external electronic device 202 may obtain two frames from a single data packet. For example, the external electronic device 202 may obtain two frames, one sequential in time from the other, by demodulating the received data packet.

According to an embodiment, the external electronic device 202 may decode the preceding frame among the two frames received in the preceding connection interval to output an audio signal in the current connection interval and may output an audio signal, using the subsequent frame in the subsequent connection interval after buffering the subsequent frame of the two frames. For example, in the first connection interval T1, the external electronic device 202 may receive the first data packet 810 including the first frame and the second frame. The external electronic device 202 may decode the first frame in the second connection interval T2 subsequent to the first connection interval T1 to output an audio signal and may buffer the second frame. The external electronic device 202 may output the audio signal, using the second frame buffered in the third connection interval T3 subsequent to the second connection interval T2.

According to an embodiment, the electronic device 101 may perform retransmission of a lost packet in the connection interval where data packets are not otherwise transmitted. For example, the third data packet 830 transmitted in the fifth connection interval T5 may be lost due to interference. In this case, the electronic device 101 may retransmit the third data packet 830 in the subsequent sixth connection interval T6. For example, when the acknowledgment for the third data packet 830 is not received from the external electronic device 202 or when the negative acknowledgment for the third data packet 830 is received, the electronic device 101 may retransmit the third data packet 830.

According to an embodiment, the external electronic device 202 may decode a preceding first frame among a plurality of frames of the data packet received in the first connection interval T1 to output the decoded first frame in the second connection interval T2; next, the external electronic device 202 may buffer the second frame and then may output the buffered second frame in the third connection interval T3. In this case, the external electronic device 202 not only buffers one subsequent frame but also delays the output by one frame. Further, for example even though the third data packet 830 transmitted in the fifth connection interval T5 is lost, the external electronic device 202 may perform seamless audio output by obtaining a retransmitted third data packet 830 in the sixth connection interval T6 during the delay. This way, unwanted muting of the audio is reduced because timely retransmission is enabled.

Figure 9:
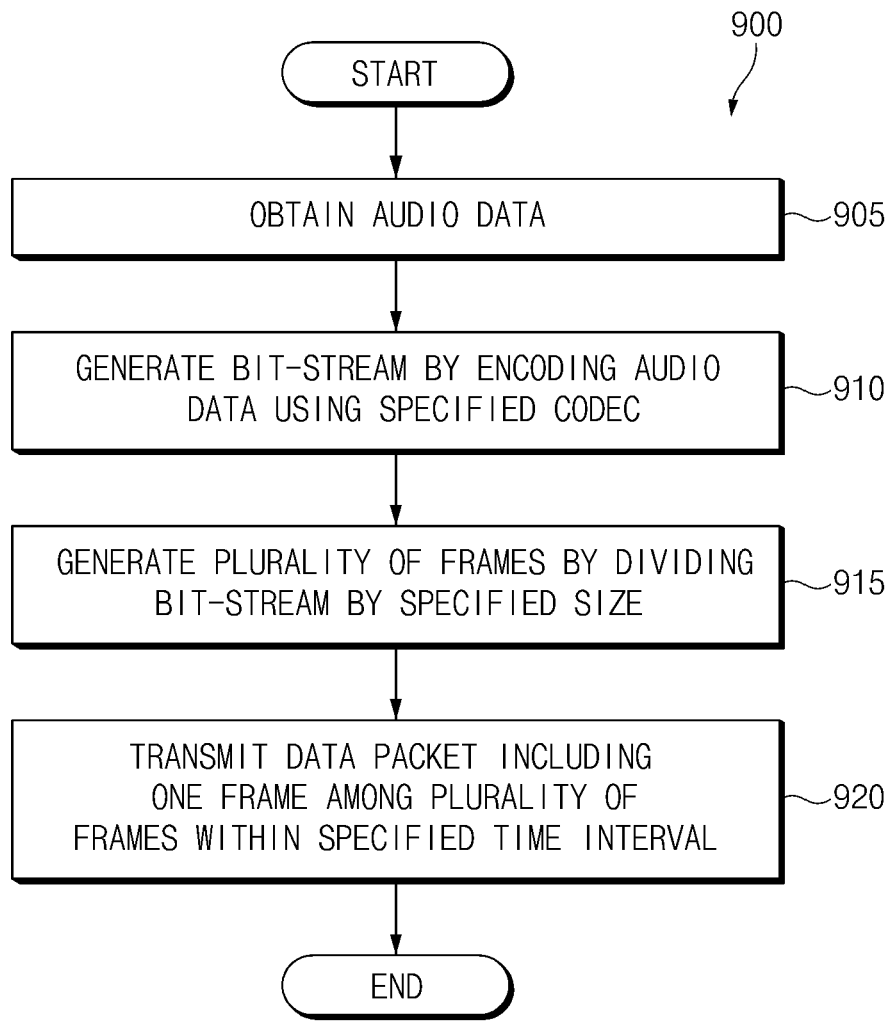
FIG. 9 is a flowchart of a method of transmitting audio data, according to an embodiment.

FIG. 9 is a flowchart 900 of a method of transmitting audio data, according to an embodiment.

According to an embodiment, the electronic device 101 may be an electronic device that communicates with an external electronic device (e.g., the external electronic device 202 of FIG. 2). For example, the electronic device 101 may be an electronic device configured to communicate with the external electronic device 202 at specified time intervals (e.g., connection intervals). According to an embodiment, the electronic device 101 may be configured to transmit data packets including audio data to the external electronic device 202 at specified time intervals.

According to an embodiment, in operation 905, the electronic device 101 may obtain audio data. For example, the electronic device 101 may obtain the audio data by receiving a wireless signal including the audio data using a communication circuit (e.g., the communication module 190 of FIG. 1). For another example, the electronic device 101 may obtain the audio data using an input device (e.g., the input device of FIG. 1) such as a microphone. For another example, the electronic device 101 may obtain the audio data stored in a memory (e.g., the memory 130 of FIG. 1). The above methods of obtaining audio data are only examples, and the electronic device 101 may obtain the audio data via various methods. For example, the audio data may be a digital signal of an audio signal. The digital signal may be obtained by converting an analog audio signal to the digital signal.

According to an embodiment, in operation 910, the electronic device 101 may generate a bit-stream by encoding the audio data, using a specified codec. According to an embodiment, the electronic device 101 may generate the bit-stream by encoding the audio data using the audio codec of a particular communication specification (e.g., Bluetooth communication specification) for communication with the external electronic device 202. For example, the electronic device 101 may generate the bit-stream, using the codec having compression rate of 32 kbps.

According to an embodiment, in operation 915, the electronic device 101 may generate a plurality of frames with sizes corresponding to a specified time interval (e.g., connection interval) from the bit-stream. For example, the electronic device 101 may generate a plurality of frames by dividing the bit-stream by the specified size. For example, the size of each of the plurality of frames may correspond to the period of the time slots in which the electronic device 101 transmits data to the external electronic device 202. For example, the specified time interval may be 7.5 ms. The electronic device 101 may be configured to transmit a data packet at a specified time interval.

According to an embodiment, operation 910 and operation 915 may be combined. For example, the electronic device 101 may generate a frame by encoding audio data into a bit-stream having the specified size, using a specified codec. The electronic device 101 may generate a plurality of frames by sequentially encoding the audio data.

According to an embodiment, in operation 920, the electronic device 101 may transmit a data packet including one frame among a plurality of frames within a specified time interval. For example, the electronic device 101 may transmit a data packet to the external electronic device 202 at a specified time interval (e.g., connection interval). For example, as described above with reference to FIG. 6, the electronic device 101 may transmit a data packet including one frame to the external electronic device 202 at a specified time interval.

According to an embodiment, the electronic device 101 may generate a data packet using data packet format according to a communication specification (e.g., Bluetooth) for communication with the external electronic device 202. For example, the electronic device 101 may generate an EV3 type data packet including one frame. The type of the data packet may be indicated by a field of the header of the packet (e.g., the TYPE 512 of FIG. 5). The electronic device 101 may transmit the data packet using a communication circuit to the external electronic device 202. The electronic device 101 may sequentially transmit data packets to the external electronic device 202 at specified time intervals.

According to an embodiment, the size of the data packet may be such that the size of the traffic margin is at least about 50% or more of a specified time interval. For example, the electronic device 101 may select an audio codec having a compression rate that allows the generated data packet to have a traffic margin of at least about 50% or more with respect to the specified time interval.

According to an embodiment, when the electronic device 101 fails to transmit a data packet to the external electronic device 202, the electronic device 101 may retransmit the data packet. For example, when an acknowledgment is not received from the external electronic device 202 or when a negative acknowledgment is received from the external electronic device 202, the electronic device 101 may retransmit the data packet. According to an embodiment, the electronic device 101 may retransmit the data packet within the same time interval as the time interval in which the data packet is transmitted (i.e. within the traffic margin).

Figure 10:
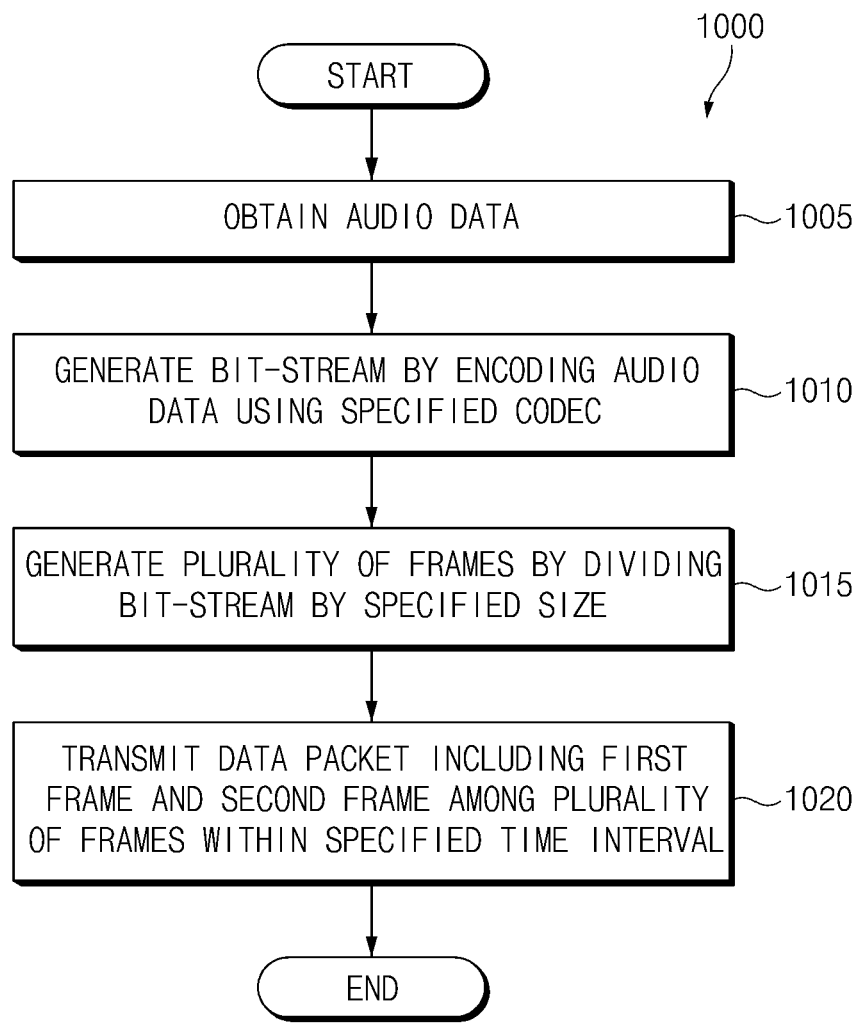
FIG. 10 is a flowchart of a method of transmitting a data packet including a plurality of frames, according to an embodiment.

FIG. 10 is a flowchart 1000 of a method of transmitting a data packet including a plurality of frames, according to an embodiment.

According to an embodiment, the electronic device 101 may be an electronic device that communicates with an external electronic device (e.g., the external electronic device 202 of FIG. 2). For example, the electronic device 101 may be an electronic device configured to communicate with the external electronic device 202 at specified time intervals (e.g., connection intervals). According to an embodiment, the electronic device 101 may be configured to transmit a data packet including audio data to the external electronic device 202 at a specified time interval.

According to an embodiment, in operation 1005, the electronic device 101 may obtain audio data. Operation 1005 may be similar to operation 905 of FIG. 9.

According to an embodiment, in operation 1010, the electronic device 101 may generate a bit-stream by encoding the audio data, using a specified codec. Operation 1010 may be similar to operation 910 of FIG. 9.

According to an embodiment, in operation 1015, the electronic device 101 may generate a plurality of frames with sizes corresponding to the specified time interval (e.g., connection interval) from the bit-stream. Operation 1015 may be similar to operation 915 of FIG. 9.

According to an embodiment, in operation 1020, the electronic device 101 may transmit a data packet including first frame and a second frame among the plurality of frames within the specified time interval. For example, the electronic device 101 may transmit a data packet to the external electronic device 202 at the beginning or end of the specified time interval (e.g., connection interval).

According to an embodiment, the electronic device 101 may generate the data packet using a data packet format according to a communication specification (e.g., Bluetooth) for communication with the external electronic device 202. For example, the electronic device 101 may generate a 2-EV3 type data packet including a plurality of frames. The type of the data packet may be indicated by a field of the header of the packet (e.g., the TYPE 512 of FIG. 5). For example, a plurality of frames may correspond to pieces of continuous audio data. The electronic device 101 may transmit data packets generated using a communication circuit, to the external electronic device 202.

According to an embodiment, in the next specified time interval, the electronic device 101 may transmit a data packet including the second frame and a third frame subsequent to the second frame, to the external electronic device 202. For example, the electronic device 101 may transmit a data packet including at least one frame among a plurality of frames included in the preceding data packet in the next specified time interval. For example, the plurality of frames included in the data packet may sequentially correspond to pieces of continuous voice data. For example, as described above with reference to FIG. 7, the electronic device 101 may transmit a data packet including a plurality of frames in each connection interval.

According to an embodiment, the electronic device 101 may transmit a data packet including a plurality of frames to the external electronic device 202, in each even-numbered or odd-numbered time intervals. For example, as described above with reference to FIG. 8, the electronic device 101 may transmit a data packet including a plurality of frames in each odd-numbered connection interval. The data packet may include a plurality of frames subsequent to the frames of the data packet transmitted in the previous time interval. For example, when the electronic device 101 transmits a data packet including the first frame and the second frame in the previous even-numbered time interval, the electronic device 101 may transmit a data packet including the third frame and the fourth frame, which are subsequent to the second frame, in the next even-numbered time interval. When the electronic device 101 is configured to transmit a data packet in each even-numbered time interval, the state of the electronic device 101 may be transitioned from the second state (e.g., an idle state or an inactive state) to the first state (e.g., a wake-up state or an active state) in the even-numbered time interval, and then the electronic device 101 may transmit a data packet; next, the state of the electronic device 101 may be transitioned to the first state until the next even-numbered time interval after transmission of the data packet. In another example, when the electronic device 101 is configured to transmit a data packet for each odd-numbered time interval, the state of the electronic device 101 may be transitioned from the second state (e.g., an idle state or an inactive state) to the first state (e.g., a wake-up state or an active state) in the odd-numbered time interval, and then the electronic device 101 may transmit a data packet; next, the state of the electronic device 101 may be transitioned to the first state until the next odd-numbered time interval after transmission of the data packet.

According to an embodiment, in the case where the electronic device 101 transmits a data packet as shown in FIG. 8, when the electronic device 101 fails to transmit a data packet to the external electronic device 202, the electronic device 101 may retransmit the data packet. For example, when an acknowledgment is not received from the external electronic device 202 or when a negative acknowledgment is received from the external electronic device 202, the electronic device 101 may retransmit the data packet. According to an embodiment, the electronic device 101 may perform retransmission of the data packet within a time interval subsequent to the time interval in which the previous data packet is transmitted. For example, in the case where the electronic device 101 is configured to transmit a data packet for each even-numbered time interval, when the data packet transmitted in an even-numbered time interval is lost, the electronic device 101 may perform retransmission of data in the subsequent odd-numbered time interval. In another example, in the case where the electronic device 101 is configured to transmit a data packet for each odd-numbered time interval, when the data packet transmitted in an odd-numbered time interval is lost, the electronic device 101 may perform retransmission of data in the subsequent odd-numbered time interval.

Figure 11:
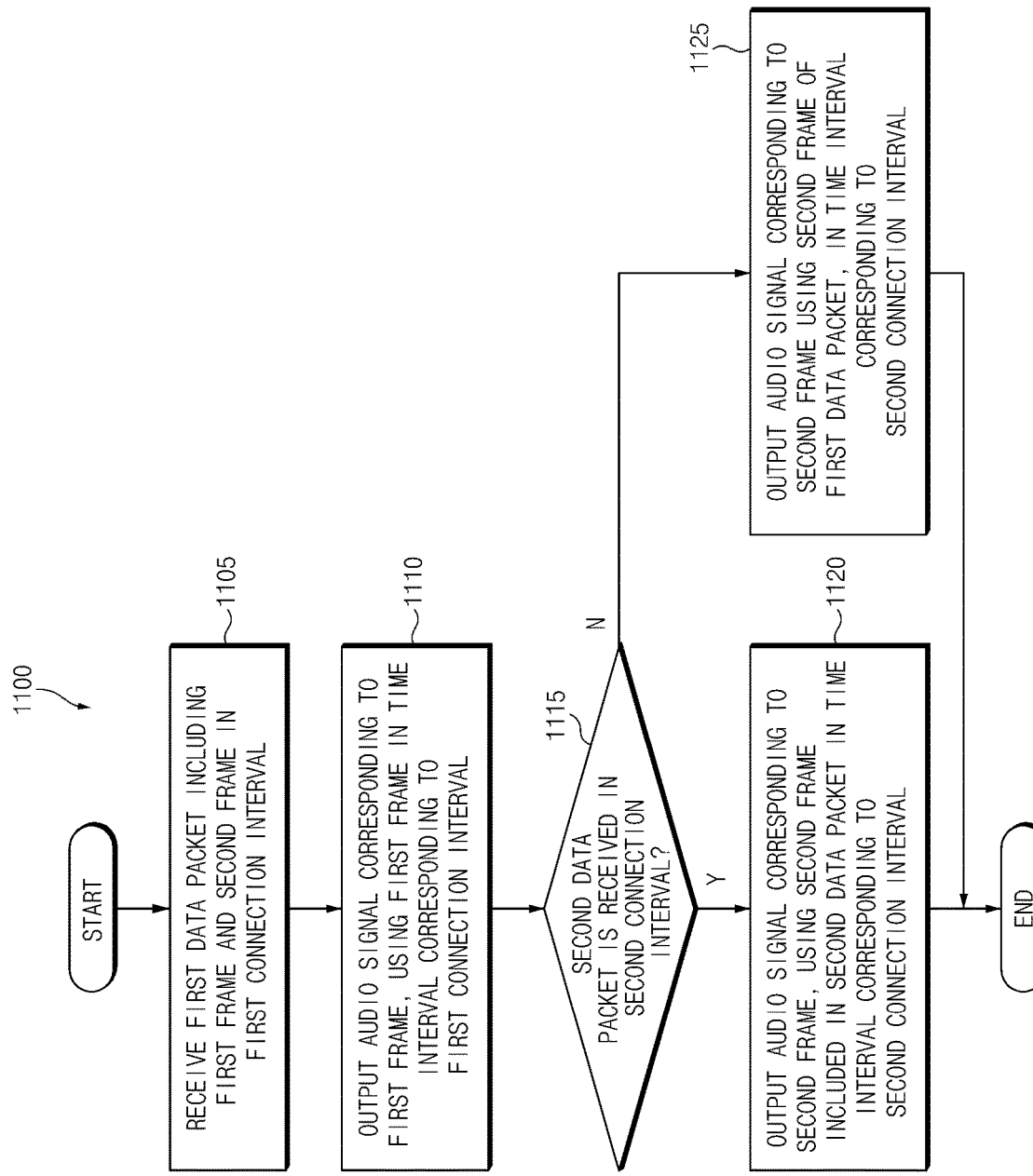
FIG. 11 is a flowchart of a method of outputting audio data, according to an embodiment.

FIG. 11 is a flowchart 1100 of a method of outputting audio data, according to an embodiment.

According to an embodiment, the electronic device 101 may be an electronic device that communicates with an external electronic device (e.g., the external electronic device 202 of FIG. 2). For example, the electronic device 101 may be an electronic device configured to communicate with the external electronic device 202 at specified time intervals (e.g., connection intervals). According to an embodiment, the electronic device 101 may be configured to receive data packets including audio data from the external electronic device 202 at specified time intervals.

According to an embodiment, in operation 1105, the electronic device 101 may receive a first data packet including the first frame and the second frame from the external electronic device 202 in the first connection interval. For example, one frame may include audio data of a length corresponding to a single connection interval. The second frame may include audio data subsequent to the first frame in time. Each frame may include the encoded audio data.

According to an embodiment, in operation 1110, the electronic device 101 may output an audio signal corresponding to the first frame using the first frame, in a time interval corresponding to the first connection interval. For example, the electronic device 101 may obtain an audio signal by decoding the first frame. According to an embodiment, in operation 1110, the electronic device 101 may buffer the second frame received in the first connection interval.

According to an embodiment, in operation 1115, the electronic device 101 may determine whether to a second data packet in a second connection interval is received. For example, the electronic device 101 may determine whether the second data packet including the second frame and the third frame subsequent to the second frame is received in the second connection interval subsequent to the first connection interval. According to an embodiment, the electronic device 101 may determine whether the second data packet is successfully received, using a cyclic redundancy check (CRC) for the second data packet. For example, when the electronic device 101 fails the CRC for the second data packet, the electronic device 101 may determine that the second data packet is not received.

According to an embodiment, in operation 1120, when the second data packet is received, the electronic device 101 may output an audio signal corresponding to the second frame using the second frame included in the second data packet, in a time interval corresponding to the second connection interval. According to an embodiment, in operation 1120, the electronic device 101 may buffer the third frame included in the second data packet. For example, the electronic device 101 may flush away the previously buffered second frame from the buffer.

According to an embodiment, in operation 1125, when the second data packet is not received, the electronic device 101 may output an audio signal corresponding to the second frame using the second frame of the first data packet, in a time interval corresponding to the second connection interval. For example, the electronic device 101 may output an audio signal, using the second frame buffered in operation 1110.

In the embodiment of FIG. 11, it may be assumed that the external electronic device 202 is configured to transmit data packet including a plurality of frames at each connection interval.

For example, the electronic device 101 may receive a data packet generated using a data packet format according to a communication specification (e.g., Bluetooth) for communication with the external electronic device 202. For example, the electronic device 101 may receive a 2-EV3 type data packet. The type of the data packet may be indicated by a field of the header of the packet (e.g., the TYPE 512 of FIG. 5).

Figure 12:
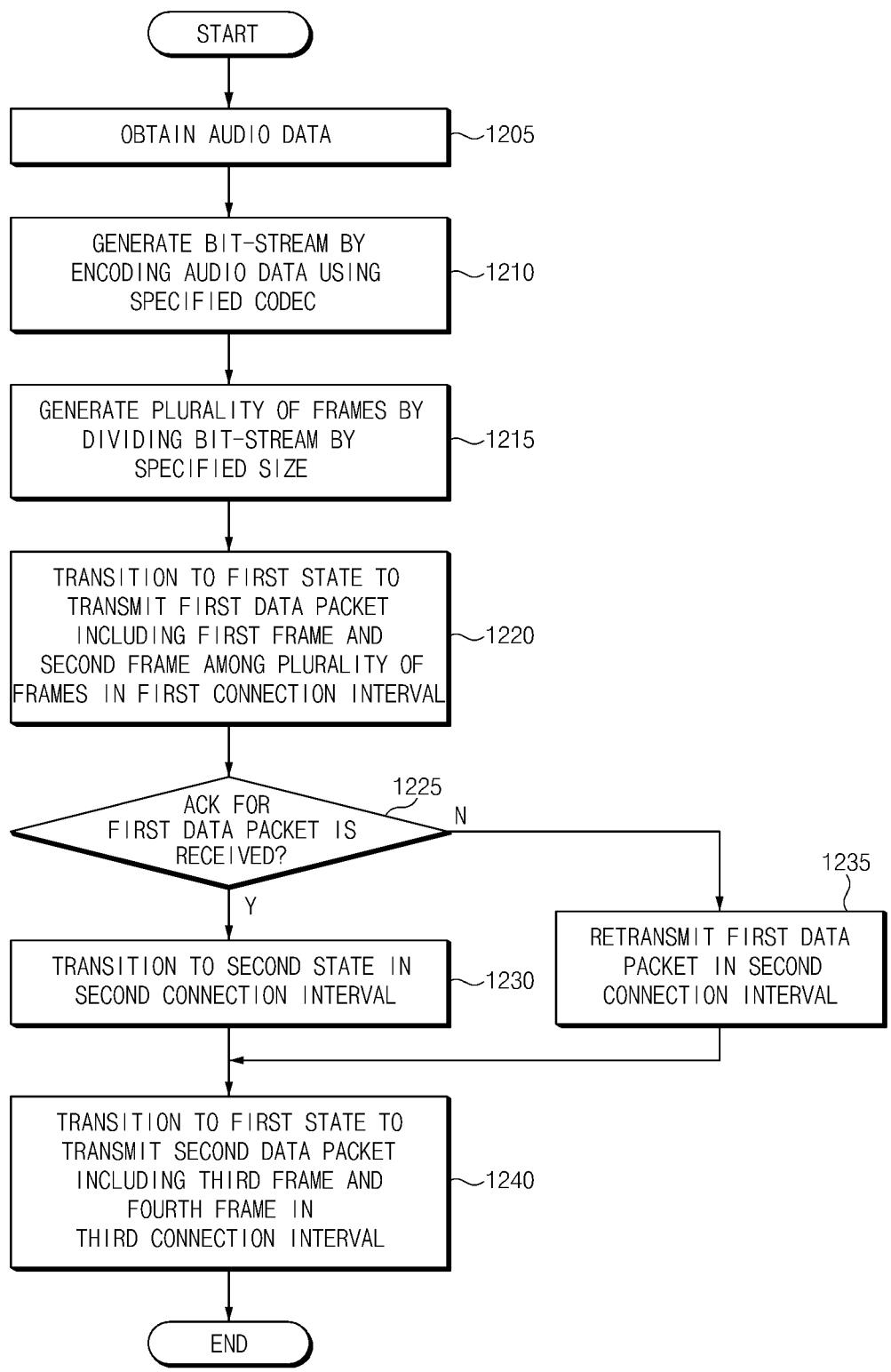
FIG. 12 is a flowchart of a method of transmitting audio data, according to an embodiment.

FIG. 12 is a flowchart 1200 of a method of transmitting audio data, according to an embodiment.

According to an embodiment, the electronic device 101 may be an electronic device that communicates with an external electronic device (e.g., the external electronic device 202 of FIG. 2). For example, the electronic device 101 may be an electronic device configured to communicate with the external electronic device 202 at specified time intervals (e.g., connection intervals). According to an embodiment, the electronic device 101 may be configured to transmit a data packet including audio data to the external electronic device 202 at a specified time interval.

According to an embodiment, in operation 1205, the electronic device 101 may obtain audio data. Operation 1205 may be similar to operation 905 of FIG. 9.

According to an embodiment, in operation 1210, the electronic device 101 may generate a bit-stream by encoding the audio data, using a specified codec. Operation 1210 may be similar to operation 910 of FIG. 9.

According to an embodiment, in operation 1215, the electronic device 101 may generate a plurality of frames with sizes corresponding to a specified time interval (e.g., connection interval) from the bit-stream. Operation 1215 may be similar to operation 915 of FIG. 9.

According to an embodiment, in operation 1220, the state of the electronic device 101 may be transitioned to a first state, and then the electronic device 101 may transmit a first data packet including a first frame and a second frame among a plurality of frames within a first connection interval. For example, the electronic device 101 may transmit the first data packet in the first state (e.g., active state or wake-up state). In another example, when the electronic device 101 is already operating in the first state in operation 1220, the electronic device 101 may transmit the first data packet while remaining in the first state.

According to an embodiment, in operation 1225, the electronic device 101 may determine whether an acknowledgment ACK for the first data packet is received. For example, when "ACK" is not received from the external electronic device 202 within the specified time after the transmission of the first data packet, the electronic device 101 may determine that "ACK" for the first data packet is not received. In another example, when "NACK" for the first data packet is received from the external electronic device 202, the electronic device 101 may determine that "ACK" is not received.

According to an embodiment, in operation 1230, when "ACK" for the first data packet is received, the state of the electronic device 101 may be transitioned from the first state (e.g., active state or wake-up state) to the second state (e.g., inactive state or idle state) in the second connection interval subsequent to the first connection interval. For example, the electronic device 101 may control at least part of a communication circuit (e.g., the communication module 190 of FIG. 1) of the electronic device 101 to be in the second state.

According to an embodiment, in operation 1235, when "ACK" for the first data packet is not received, the electronic device 101 may retransmit the first data packet in the second connection interval subsequent to the first connection interval. In doing so, the electronic device 101 may operate in the first state in the second connection interval.

According to an embodiment, in operation 1240, the state of the electronic device 101 may be transitioned to the first state and then, the electronic device 101 may transmit a second data packet including the third frame and the fourth frame in the third connection interval subsequent to the second connection interval. For example, when an ACK is received, the state of the electronic device 101 may be transitioned to the second state; then, when the specified time interval (i.e. period of the second connection interval) elapses, the state of the electronic device 101 may be transitioned from the second state to the first state to transmit the second data packet, and then the electronic device 101 may transmit the second data packet. In another example, when "ACK" is not received, the electronic device 101 may transmit the second data packet while remaining in the first state. In this case, the transition to the first state in operation 1240 may be omitted.

According to an embodiment, the electronic device 101 may generate a data packet using a data packet format according to a communication specification (e.g., Bluetooth) for communication with the external electronic device 202. For example, the electronic device 101 may generate a 2-EV3 type data packet including a plurality of frames. The type of the data packet may be indicated by a field of the header of the packet (e.g., the TYPE 512 of FIG. 5). For example, a plurality of frames may correspond to pieces of continuous audio data. The electronic device 101 may transmit a data packet generated using a communication circuit, to the external electronic device 202.

According to an embodiment, the electronic device 101 may transmit a data packet including a plurality of frames to the external electronic device 202, in each even-numbered or odd-numbered time interval. For example, as described above with reference to FIG. 8, the electronic device 101 may transmit a data packet including a plurality of frames in each odd-numbered connection interval. For example, the data packet may include a plurality of frames subsequent to the frames of the data packet transmitted in the previous time interval. When the electronic device 101 transmits a data packet including the first frame and the second frame in the previous even-numbered time interval, the electronic device 101 may transmit a data packet including the third frame and the fourth frame, which are subsequent to the second frame, in the next even-numbered time interval. When the electronic device 101 is configured to transmit a data packet in each even-numbered time interval, the state of the electronic device 101 may be transitioned from the second state (e.g., idle state or inactive state) to the first state (e.g., wake-up state or active state) in the even-numbered time interval, and then the electronic device 101 may transmit a data packet; next, the state of the electronic device 101 may be transitioned to the first state until the next even-numbered time interval after transmission of the data packet. In another example, when the electronic device 101 is configured to transmit a data packet for each odd-numbered time interval, the state of the electronic device 101 may be transitioned from the second state (e.g., idle state or inactive state) to the first state (e.g., wake-up state or active state) in the odd-numbered time interval, and then the electronic device 101 may transmit a data packet; next, the state of the electronic device 101 may be transitioned to the first state until the next odd-numbered time interval after transmission of the data packet.

According to an embodiment, an electronic device 101 may include a communication circuit (e.g., the communication module 190 of FIG. 1), a processor (e.g., the processor 120 of FIG. 1) operatively connected to the communication circuit, and a memory (e.g., the memory 130 of FIG. 1) operatively connected to the processor. According to an embodiment, the memory may store instructions that, when executed, cause the processor to perform the actions of the electronic device 101 to be described. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the electronic device 101 may obtain audio data, may encode the audio data using a specified codec to generate a plurality of frames each having a size corresponding to a single connection interval; and may transmit a first data packet including a first frame and a second frame subsequent to the first frame among the plurality of frames to an external electronic device 202 in a first connection interval.

According to an embodiment, the electronic device 101 may be configured to communicate with the external electronic device 202 according to a Bluetooth communication specification, using the communication circuit. For example, the specified codec may be a codec having the compression rate of 32 kilobits per second (kbps).

According to an embodiment, when executed, the instructions may cause the processor to transmit a data packet to the external electronic device 202 at a period corresponding to the connection interval, using the communication circuit. For example, the data packet may be a 2-extended voice3 (2-EV3) type packet.

According to an embodiment, when executed, the instructions may cause the processor to transmit a second data packet including the second frame and a third frame subsequent to the second frame among the plurality of frames to the external device in a second connection interval subsequent to the first connection interval.

According to an embodiment, when executed, the instructions may cause the processor to transmit a data packet to the external electronic device 202 at a doubled period of the connection interval, using the communication circuit. According to an embodiment, when executed, the instructions may cause the processor to control the communication circuit to be in a first state during a connection interval in which a data packet is transmitted and in a second state during a connection interval in which a data packet is not transmitted. For example, the power consumption of the first state (e.g., active or wake-up state) may be higher than the power consumption of the second state (e.g., inactive or idle state).

According to an embodiment, when executed, the instructions may cause the processor of the electronic device 101 to obtain audio data, to encode the audio data using a specified codec to generate a plurality of frames each having a size corresponding to a single connection interval, and to transmit a first data packet including two or more frames among the plurality of frames to an external electronic device at a first specified time interval, using the communication circuit. For example, a second data packet transmitted in a second specified time interval includes at least one frame that is same as one of the two or more frames included in the first data packet transmitted in the first specified time interval preceding the second specified time interval.

According to an embodiment, the electronic device 101 may be configured to communicate with the external electronic device 202 according to a Bluetooth communication specification, using a communication circuit (e.g., the communication module 190 of FIG. 1) of the electronic device 101. For example, the specified codec may be a codec having the compression rate of 32 kilobits per second (kbps). For example, the data packet may be a 2-extended voice3 (2-EV3) type packet. For example, the length of the connection interval may be 7.5 ms. For example, the second data packet may include a first frame and a second frame subsequent to the first frame.

According to an embodiment, when executed, the instructions may cause the processor to obtain the audio data by receiving a wireless signal including the audio data using a communication circuit.

According to an embodiment, a data transmitting method of the electronic device 101 may include obtaining audio data, encoding the audio data using a specified codec to generate a plurality of frames each having a size corresponding to a single connection interval, transmitting a first data packet including a first frame and a second frame subsequent to the first frame among the plurality of frames to an external electronic device in a first connection interval, and transmitting a second data packet including the second frame and a third frame subsequent to the second frame to the external electronic device in a second connection interval subsequent to the first connection interval.

According to an embodiment, an electronic device (e.g., the external electronic device 202 of FIG. 2) may include a speaker (e.g., the sound output device 155 of FIG. 1), a communication circuit (e.g., the communication module 190 of FIG. 1), a processor (e.g., the processor 120 of FIG. 1) operatively connected to the communication circuit, and/or a memory (e.g., the memory 130 of FIG. 1) operatively connected to the communication module 190 and the processor. For example, the memory may store one or more instructions that, when executed, cause the processor to perform the operations to be described.

According to an embodiment, the processor may receive first data (e.g., the first data packet 710 of FIG. 7) including a first audio frame corresponding to a first interval (e.g., T1 of FIG. 7) and a second audio frame corresponding to a second interval (e.g., T2 of FIG. 7) subsequent to the first interval, using the communication circuit (e.g., operation 1105 of FIG. 11) The processor may store the second audio frame in the memory in response to reception of the first data. The processor may output a first audio signal generated based on the first audio frame, through the speaker (e.g., operation 1110 of FIG. 11). When second data (e.g., the second data packet 720 of FIG. 7) including the second audio frame and a third audio frame corresponding to a third interval subsequent to the second interval is received using the communication circuit (e.g., operation 1115 of FIG. 11), the processor may store the third audio frame in the memory and output a second audio signal generated based on the second audio frame of the second data through the speaker (e.g., operation 1120 of FIG. 11). When at least part of the second data is not received using the communication circuit (e.g., operation 1115 of FIG. 11), the processor may output a second audio signal generated based on the second audio frame of the first data stored in the memory, through the speaker (e.g., operation 1125 of FIG. 11).

According to an embodiment, after at least part of the second data is not received, the processor may receive third data including the third audio frame and a fourth audio frame corresponding to a fourth interval subsequent to the third interval, using the communication circuit. For example, when at least part of the second data is not received, the processor may receive the third data without a request for retransmission of the second data or without receiving the second data.

For example, a length of the first audio signal may correspond to a length of the first interval, and a length of the second audio signal may correspond to a length of the second interval.

For example, each of the first data and the second data may correspond to a single data packet according to a Bluetooth communication specification. For example, a type of the data packet may be 2-extended voice3 (2-EV3).

According to an embodiment, the processor may receive the data packet at a period corresponding to the first interval, using the communication circuit.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to certain embodiments disclosed in the specification, an electronic device may increase the signal to noise ratio (SNR) at the receiver by increasing a traffic margin.

In certain embodiments in the specification, a method of transmitting and receiving audio data that is more robust to interference may be provided.

According to certain embodiments disclosed in the specification, even though some packets are lost within the connection interval, the electronic device may prevent unwanted muting of the audio signal by performing retransmission within the same connection interval using the traffic margin.

According to certain embodiments disclosed in this specification, the electronic device may buffer the audio data, using at least part of a plurality of bit-stream frames in the received data packet.

In addition, a variety of features and advantages directly or indirectly understood through the disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a speaker;
a communication circuit;
a processor operatively connected to the speaker and the communication circuit; and
a memory operatively connected to the processor, wherein the memory stores one or more instructions that, when executed, cause the processor to:
receive first data including a first audio frame corresponding to a first interval and a second audio frame corresponding to a second interval subsequent to the first interval, using the communication circuit;
store the second audio frame in the memory in response to reception of the first data;
output a first audio signal generated based on the first audio frame, through the speaker;

when second data including the second audio frame and a third audio frame corresponding to a third interval subsequent to the second interval is received using the communication circuit, store the third audio frame in the memory and output a second audio signal generated based on the second audio frame of the second data through the speaker; and when at least part of the second data is not received using the communication circuit, output the second audio signal generated based on the second audio frame of the first data stored in the memory, through the speaker.

2. The electronic device of claim 1, wherein the one or more instructions, when executed, further cause the processor to:

when the part of the second data is not received, receive third data including the third audio frame and a fourth audio frame corresponding to a fourth interval subsequent to the third interval, using the communication circuit.

3. The electronic device of claim 2, wherein the one or more instructions, when executed, further cause the processor to:

when the part of the second data is not received, receive the third data without a request for retransmission of the second data or without receiving the second data.

4. The electronic device of claim 1, wherein a length of the first audio signal corresponds to a length of the first interval, and wherein a length of the second audio signal corresponds to a length of the second interval.

5. The electronic device of claim 1, wherein each of the first data and the second data corresponds to a single data packet of a Bluetooth communication specification.

6. The electronic device of claim 5, wherein a type of the data packet is 2-extended voice3 (2-EV3).

7. The electronic device of claim 5, wherein the one or more instructions, when executed, further cause the processor to:

receive the single data packet at a period corresponding to the first interval, using the communication circuit.

8. An electronic device comprising:
a communication circuit;
a processor operatively connected to the communication circuit; and
a memory operatively connected to the processor, wherein the memory stores one or more instructions that, when executed, cause the processor to:
obtain audio data;
encode the audio data using a specified codec to generate a plurality of frames each having a size corresponding to a single connection interval; and
transmit a first data packet including two or more frames among the plurality of frames to an external electronic device at a first specified time interval, using the communication circuit,
wherein a second data packet transmitted in a second specified time interval includes at least one frame that is same as one of the two or more frames included in the first data packet transmitted in the first specified time interval preceding the second specified time interval.

9. The electronic device of claim 8, wherein the electronic device is configured to communicate with the external electronic device according to a Bluetooth communication specification, using the communication circuit.

10. The electronic device of claim 9, wherein a compression rate of the specified codec is 32 kilobits per second (kbps).

11. The electronic device of claim 9, wherein a type of the first data packet is 2-extended voice3 (2-EV3).

12. The electronic device of claim 9, wherein a length of the single connection interval is 7.5 milliseconds (ms).

13. The electronic device of claim 9, wherein the second data packet includes a first frame and a second frame subsequent to the first frame, and
wherein the first frame is included in the first data packet.

14. The electronic device of claim 8, wherein the one or more instructions, when executed, further cause the processor to:

obtain the audio data by receiving a wireless signal including the audio data using the communication circuit.

15. The electronic device of claim 8, wherein a length of each of the first specified time interval and the second specified time interval corresponds to a length of the single connection interval.

16. A data transmitting method of an electronic device, the method comprising:
obtaining audio data;
encoding the audio data using a specified codec to generate a plurality of frames each having a size corresponding to a single connection interval;
transmitting a first data packet including a first frame and a second frame subsequent to the first frame among the plurality of frames to an external electronic device in a first connection interval; and
transmitting a second data packet including the second frame and a third frame subsequent to the second frame to the external electronic device in a second connection interval subsequent to the first connection interval.

17. The method of claim 16, wherein the electronic device is configured to communicate with the external electronic device according to a Bluetooth communication specification.

18. The method of claim 17, wherein a compression rate of the specified codec is 32 kilobits per second (kbps).

19. The method of claim 17, wherein a type of each of the first data packet and the second data packet is 2-extended voice3 (2-EV3).

20. The method of claim 17, wherein a length of each of the first connection interval and the second connection interval is 7.5 milliseconds (ms).

* * * * *